(12) United States Patent
Tiedemann, Jr. et al.

(10) Patent No.: US 7,010,068 B2
(45) Date of Patent: Mar. 7, 2006

(54) METHOD AND APPARATUS FOR COORDINATING TRANSMISSION OF SHORT MESSAGES WITH HARD HANDOFF SEARCHES IN A WIRELESS COMMUNICATIONS SYSTEM

(75) Inventors: Edward G. Tiedemann, Jr., San Diego, CA (US); Olivier Glauser, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 28 days.

(21) Appl. No.: 10/354,689

(22) Filed: Jan. 28, 2003

(65) Prior Publication Data

US 2003/0118136 A1 Jun. 26, 2003

Related U.S. Application Data

(63) Continuation of application No. 09/082,499, filed on May 21, 1998, now Pat. No. 6,535,563.

(51) Int. Cl.
*H04L 27/06* (2006.01)
*H04Q 7/00* (2006.01)
*H04Q 7/20* (2006.01)

(52) U.S. Cl. .................. 375/344; 455/438; 370/330
(58) Field of Classification Search ............... 375/354, 375/344, 316, 295, 130, 141, 147, 132, 133, 375/134, 135, 136; 455/438, 436–444, 150.1, 455/182.1, 182.3, 182.2; 370/328–334, 335, 370/337, 342
See application file for complete search history.

(56) References Cited

U.S. PATENT DOCUMENTS

| | | | | |
|---|---|---|---|---|
| 5,103,459 A | * | 4/1992 | Gilhousen et al. .......... | 370/206 |
| 5,267,261 A | * | 11/1993 | Blakeney, II et al. ....... | 370/332 |
| 5,546,464 A | * | 8/1996 | Raith et al. .................. | 380/272 |
| 5,594,718 A | * | 1/1997 | Weaver et al. .............. | 370/331 |
| 5,625,876 A | * | 4/1997 | Gilhousen et al. .......... | 370/331 |
| 5,701,294 A | * | 12/1997 | Ward et al. .................. | 370/252 |
| 5,848,063 A | * | 12/1998 | Weaver et al. .............. | 370/331 |
| 5,930,706 A | * | 7/1999 | Raith ....................... | 455/422.1 |
| 5,937,019 A | * | 8/1999 | Padovani .................... | 375/358 |
| 5,953,325 A | * | 9/1999 | Willars ....................... | 370/335 |
| 5,999,816 A | * | 12/1999 | Tiedemann et al. ......... | 455/437 |
| 6,073,021 A | * | 6/2000 | Kumar et al. ............... | 455/442 |
| 6,075,989 A | * | 6/2000 | Moore et al. ............... | 455/436 |
| 6,101,175 A | * | 8/2000 | Schorman et al. .......... | 370/331 |
| 6,128,493 A | * | 10/2000 | Song .......................... | 455/436 |
| 6,134,440 A | * | 10/2000 | Black ......................... | 455/436 |

(Continued)

*Primary Examiner*—Tesfaldet Bocure
(74) *Attorney, Agent, or Firm*—Philip R. Wadsworth; Thien T. Nguyen; Roberta A. Young

(57) ABSTRACT

A method and apparatus for coordinating the time at which a mobile station performs searches for alternative systems to which a hard handoff will occur. The mobile station receives a command which instructs the mobile station as to when to tune to alternative frequencies in order to search for indicates of the presence of an alternative system. In another system which includes the present invention, predetermined times are defined with respect to a reference point in time that is common to both the origination base station and a mobile station. The mobile station tunes to alternative frequencies to perform searches only during these predetermined times. In addition, the mobile station coordinates the transmission of reports, which indicate the results of searches for alternative systems such that these reports are only transmitted from the mobile station when the mobile station is tuned to the origination frequency.

12 Claims, 7 Drawing Sheets

U.S. PATENT DOCUMENTS 6,151,502 A * 11/2000 Padovani et al. ............ 455/442
6,157,835 A * 12/2000 Findikli et al. ............. 455/436
6,396,820 B1 * 5/2002 Dolan et al. ................. 370/328
6,865,173 B1 * 3/2005 Czaja et al. ................. 370/342

* cited by examiner

METHOD AND APPARATUS FOR COORDINATING TRANSMISSION OF SHORT MESSAGES WITH HARD HANDOFF SEARCHES IN A WIRELESS COMMUNICATIONS SYSTEM

CLAIM OF PRIORITY UNDER 35 U.S.C. §120

The present Application for Patent is a Continuation and claims priority to U.S. Pat. No. 6,535,563 entitled "METHOD AND APPARATUS FOR COORDINATING TRANSMISSION OF SHORT MESSAGES WITH HARD HANDOFF SEARCHES IN A WIRELESS COMMUNICATIONS SYSTEM," issued on Mar. 18, 2003, both assigned to the assignee hereof and hereby expressly incorporated by reference herein.

BACKGROUND OF THE INVENTION

I. Field of the Invention

The present invention relates to communications systems. More particularly, the present invention relates to a method and apparatus for performing hard handoff between different wireless communication systems.

II. Description of the Related Art

In a code division multiple access (CDMA) spread spectrum communication system, a common frequency band is used for communication with all base stations within that system. An example of such a system is described in the TIA/EIA Interim Standard IS-95-A entitled "Mobile Station-Base Station Compatibility Standard for Dual-Mode Wideband Spread Spectrum Cellular System", incorporated herein by reference. The generation and receipt of CDMA signals is disclosed in U.S. Pat. No. 4,901,307 entitled "SPREAD SPECTRUM MULTIPLE ACCESS COMMUNICATION SYSTEMS USING SATELLITE OR TERRESTRIAL REPEATERS" and in U.S. Pat. No. 5,103,459 entitled "SYSTEM AND METHOD FOR GENERATING WAVEFORMS IN A CDMA CELLULAR TELEPHONE SYSTEM" both of which are assigned to the assignees of the present invention and incorporated herein by reference.

Signals occupying the common frequency band are discriminated at the receiving station by using a high rate pseudonoise (PN) code. The PN code modulates signals transmitted from the base stations and the mobile stations. Signals from different base stations can be separately received at the receiving station by discrimination of the unique time offset that is introduced in the PN codes assigned to each base station. The high rate PN modulation also allows the receiving station to receive a signal from a single transmission station where the signal has traveled from the base station to the receiving station over several different distinct propagation paths (commonly referred to as "multipathing"). Demodulation of multipath signals is disclosed in U.S. Pat. No. 5,490,165 entitled "DEMODULATION ELEMENT ASSIGNMENT IN A SYSTEM CAPABLE OF RECEIVING MULTIPLE SIGNALS" and in U.S. Pat. No. 5,109,390 entitled "DIVERSITY RECEIVER IN A CDMA CELLULAR TELEPHONE SYSTEM", both of which are assigned to the assignee of the present invention and incorporated herein by reference.

The use by all base stations within a particular system of a common frequency band allows simultaneous communication between a mobile station and more than one base station. This is commonly referred to as "soft handoff". One implementation of a soft handoff method and apparatus is disclosed in U.S. Pat. No. 5,101,501 entitled "SOFT HAND-OFF IN A CDMA CELLULAR TELEPHONE SYSTEM" and U.S. Pat. No. 5,267,261 entitled "MOBILE STATION ASSISTED SOFT HANDOFF IN A CDMA CELLULAR COMMUNICATIONS SYSTEM", both assigned to the assignee of the present invention and incorporated herein by reference. Similarly, a mobile station can be simultaneously communicating with two sectors of the same base station, known as "softer handoff" as disclosed in U.S. patent application entitled "METHOD AND APPARATUS FOR PERFORMING HANDOFF BETWEEN SECTORS OF A COMMON BASE STATION", U.S. Pat. No. 5,625,876 issued Apr. 29, 1997, assigned to the assignee of the present invention and incorporated herein by reference. An important feature is that both soft handoffs and softer handoffs make the new connection before breaking the existing one.

If a mobile station travels outside the boundary of the system with which it is currently communicating, it is desirable to maintain the communication link by transferring the call to a neighboring system, if one exists. The neighboring system may use any wireless technology, examples of which are CDMA, NAMPS, advanced mobile phone service (AMPS), time division multiple access (TDMA), or global mobile systems (GSM). If the neighboring system uses CDMA on the same frequency band as the current system, an inter-system soft handoff can be performed. In situations where inter-system soft handoff is not available, the communication link is transferred through a hard handoff where the current connection is broken before a new one is made. Examples of typical hard handoff situations include: (1) the situation in which a mobile station is traveling from region serviced by a CDMA system to a region serviced by a system employing an alternate technology and (2) the situation in which a call is transferred between two CDMA systems which use different frequency bands (inter-frequency hard handoff).

Inter-frequency hard handoffs can also occur between base stations of the same CDMA system. For example, a region of high demand such as a dense urban area may require a greater number of frequencies to service demand than the suburban region surrounding it. It may not be cost effective to deploy all available frequencies throughout the system. A call originating on a frequency deployed only in the high congestion area must be handed off as the user travels to a less congested area. Another example is a system that encounters interference from another service operating on an interfering frequency within the system's boundaries. As users travel into an area suffering from interference from another service, their call may need to be handed off to a different frequency.

Handoffs can be initiated using a variety of techniques. Handoff techniques, including those using signal quality measurements to initiate a handoff, are found in U.S. patent application entitled "METHOD AND APPARATUS FOR HANDOFF BETWEEN DIFFERENT CELLULAR COMMUNICATIONS SYSTEMS", U.S. Pat. No. 5,697,055 issued Dec. 9, 1997, assigned to the assignee of the present invention and incorporated herein by reference. Further disclosure of handoffs, including measurement of round-trip signal delay to initiate handoff, is disclosed in U.S. patent application entitled "METHOD AND APPARATUS FOR HARD HANDOFF IN A CDMA SYSTEM", U.S. Pat. No. 5,848,063 issued Dec. 8, 1998, assigned to the assignee of the present invention and incorporated herein by reference. Handoffs from CDMA systems to alternate technology systems are disclosed in U.S. patent application entitled "METHOD AND APPARATUS FOR MOBILE UNIT ASSISTED CDMA TO ALTERNATIVE SYSTEM HARD HANDOFF", U.S. Pat. No. 5,594,718 ('718 patent), issued Jan. 14, 1997, assigned to the assignee of the present invention and incorporated herein by reference. In the '718 patent, pilot beacons are placed at the boundaries of the system. These beacons are transmitted within the frequency band that is being monitored by the mobile that approaches, allowing the mobile to monitor the pilot beacon without retuning to another frequency band. When a mobile station reports these pilot beacons to the base station, the base station knows that the mobile station is approaching the boundary, and in response, prepares for the possibility of an intersystem hard handoff.

When a system has determined that a call should be transferred to another system via hard handoff, a message is sent to the mobile station directing it to do so along with parameters that enable the mobile station to connect with the destination system. The system from which the mobile station is departing has only estimates of the mobile station's actual location and environment, so the parameters sent to the mobile station are not guaranteed to be accurate. For example, with beacon aided handoff, the measurement of the pilot beacon's signal strength can be a valid trigger for the handoff. However, those base stations in the destination system that can effectively communicate with the mobile station are not necessarily known. However, those base stations with which the mobile has effectively communicated and which are considered to be good candidates based upon additional criteria are maintained in a list within the mobile station. Inclusion in the list is based upon allocation of forward link resources by the base station in question. Allocation of forward link resources by all possible candidate base stations is wasteful of system resources and reduces available system capacity, since only a relatively few candidates are typically required.

One method for increasing the probability of successfully completing a hard handoff is disclosed in U.S. patent application entitled "METHOD AND APPARATUS FOR PERFORMING MOBILE ASSISTED HARD HANDOFF BETWEEN COMMUNICATION SYSTEMS", U.S. Pat. No. 5,999,816 issued Dec. 7, 1999, assigned to the assignee of the present invention and incorporated herein by reference. In most current systems, the mobile station has only one radio frequency (RF) front end circuit. Therefore, only one frequency band can be received at a time. Therefore, in order for the mobile station to communicate with the destination system, contact with the origination system must cease. In the '816 patent, mobile stations tune temporarily to the frequency of the hard handoff destination system and search for available pilot signals (hereafter referred to simply as "pilots") on that frequency, for inclusion of the associated base stations in the active set. After the searching task is completed, the mobile station will retune to the original frequency to resume current communications. While tuned to an alternate frequency, any frames of data generated by the mobile station or transmitted by the base station will be corrupted. Typically, the base station will provide only a subset of the possible offsets (commonly referred to as an "enable list") for the mobile station to search.

A method for minimizing the duration of the search is disclosed in a U.S. patent application entitled "METHOD AND APPARATUS FOR PERFORMING MOBILE STATION ASSISTED HARD HANDOFF USING OFF LINE SEARCHING", U.S. Pat. No. 6,134,440, issued Oct. 17, 2000. In this application, which is assigned to the assignee of the present invention and which is incorporated herein by reference, the receiver stores information received on the frequency band used by a potential hard handoff candidate base station. This information is not processed until after the receiver is tuned back to the frequency band used by the origination base station. By storing the information for processing after the receiver has retuned to the frequency used by the origination base station, the receiver can be tuned to the frequency of the origination base station more of the time. Thus, less information is lost. Nonetheless, when the origination base station is transmitted at relatively high data rates, information will be lost. When such information is lost, the base station must retransmit the information, or the receiver must make due without that information. Accordingly, there is a need for a method and apparatus that further reduces the amount of information that is lost while tuning to alternate frequencies, such as when attempting to identify potential hard handoff candidates.

SUMMARY

The method and apparatus disclosed herein minimizes the amount of "down time" in the communication link between a mobile station and an "origination" base station while searching for a suitable system to which a mobile station assisted hard handoff will be executed.

In one example of the disclosed method and apparatus, the mobile station tunes to an alternate frequency and samples the incoming data, storing those samples in memory. During the time that the mobile station is tuned to the alternate frequency, all data being transmitted to the mobile station on the forward link is lost. Any reverse link data transmitted by the mobile station would be transmitted on the alternate frequency. Therefore, such reverse link data would not be received at the origination base station. When a sufficient number of samples have been stored, the mobile station tunes back to the origination frequency. At this time, forward link data is again received by the mobile station, and reverse link data can be successfully transmitted to the origination base station. After retuning to the origination frequency, a searcher in the mobile station will subsequently be employed to search for pilot signal offsets utilizing the stored data collected from the alternate frequency. In accordance with the method and apparatus disclosed herein, due to the relatively short period of time required to sample and store information on the alternative frequency, the active communication link is not broken. Neither is the active communication link affected by the subsequent off-line search. Alternatively, the processing may be done in real time while the receiver is tuned to the alternate frequency. However, such real time processing typically increases the amount of time that the receiver will be tuned to the alternate frequency, and thus will also increase the amount of information that will not be received by the receiver over the origination frequency.

In accordance with the method and apparatus disclosed herein, error correction coding used by the receiver allows information that cannot be received due to the receiver being tuned to the alternate frequency to be determined based upon the information that is received over the origination frequency. The method and apparatus disclosed herein further improves the receiver by increasing the amount of transmit power when information is being transmitted that will be used by the receiver to determine the content of information transmitted when the receiver was tuned to the alternate frequency. Alternatively, redundant information, which is conventionally transmitted over the origination frequency when lower data rates are being used, is removed to provide a window in time during which the receiver can be tuned to the alternate frequency.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1:
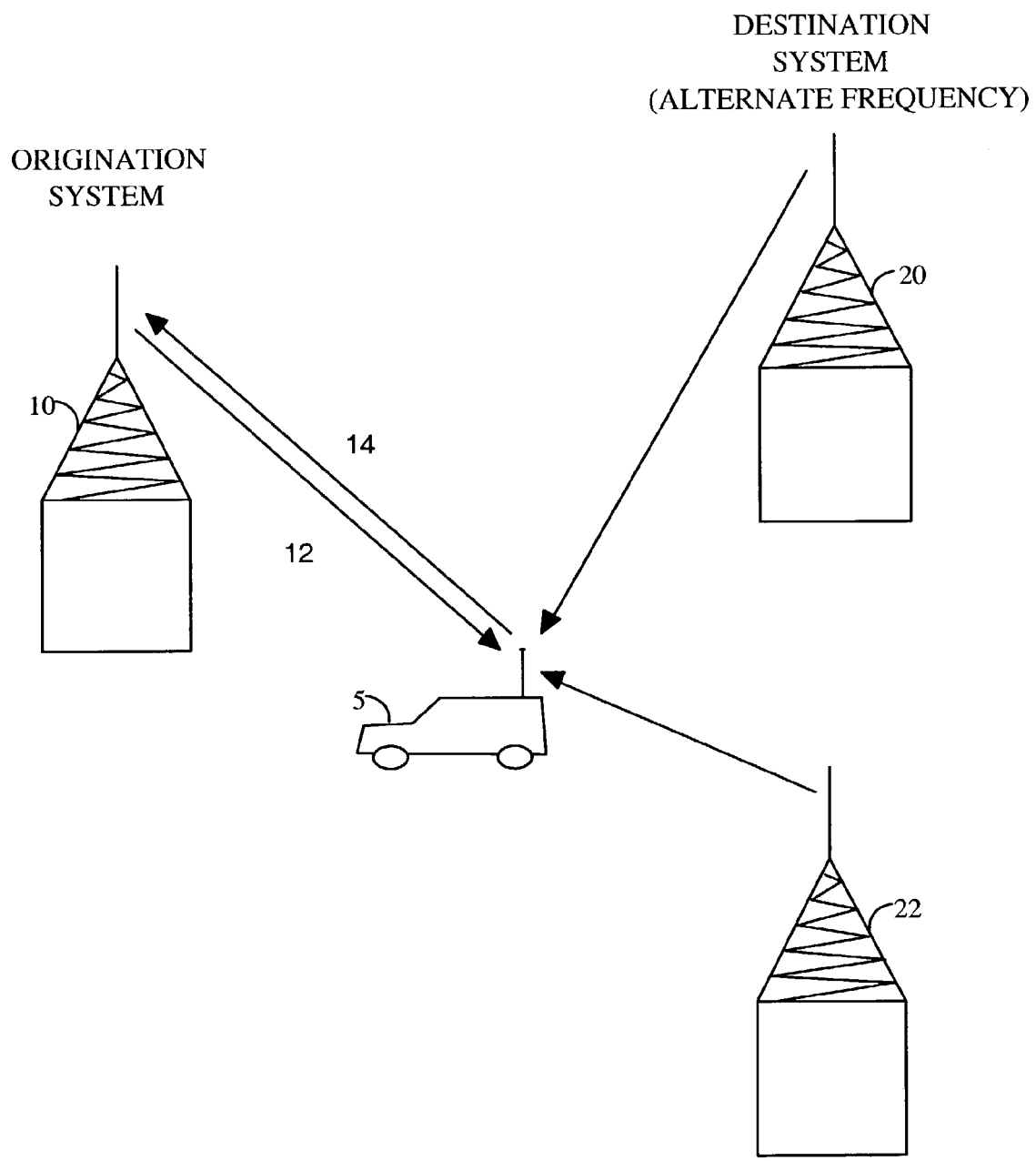
FIG. 1 is a schematic overview of a spread spectrum CDMA communications system in accordance with the present invention.

The following is a detailed description of a method and apparatus that includes embodiments of the present invention. FIG. 1 depicts a communication system in which mobile station 5 is actively communicating with a fixed communication system on a forward link 12 and reverse link 14 through an "origination" base station 10. Origination base station 10 is part of an "origination" system and transmits and receives information over forward link 12 and reverse link 14, respectively, on a first frequency, f1. Mobile station 5 is shown to be traveling from the origination system into a "destination" system which transmits and receives information on a second frequency, f2. The destination system includes "destination" base stations 20 and 22, which are not in active communication with mobile station 5. However, pilot signals (hereafter referred to simply as "pilots") from destination base stations 20 and 22 can be received by mobile station 5 if mobile station 5 is tuned to frequency f2. Both the origination and destination systems are part of the fixed communication system that allows the mobile station to communicate with other communication devices, such as conventional telephones wired to the public switch telephone network or other wireless communication devices. It should be understood that the fixed communication system may comprise any device or combination of devices that provides wireless communication between the mobile system and other communication devices.

In accordance with one example of the method and apparatus disclosed herein, the mobile station is triggered to tune to an alternate frequency. For example, the origination base station 10 may use mobile station 5 to perform a mobile station assisted interfrequency hard handoff. One example of a mobile assisted interfrequency hard handoff is disclosed in U.S. patent application entitled "METHOD AND APPARATUS FOR PERFORMING MOBILE ASSISTED HARD HANDOFF BETWEEN COMMUNICATION SYSTEMS", U.S. Pat. No. 5,999,816, filed Dec. 7, 1999, assigned to the assignee of the present invention. In such mobile assisted interfrequency hard handoffs, the origination base station 10 transmits a "Tune_Message" to mobile station 5. The Tune Message directs the mobile station to tune to an alternate frequency, f2 in this case, and to search for a set of available pilots, the pilots of destination base stations 20 and 22, for example.

Alternatively, other events may trigger the mobile station to search for hard handoff candidates. For example, the mobile may detect a signal, such as a beacon signal being transmitted by base stations within another system. Such a beacon may be transmitted within the frequency band being monitored by the mobile station. The beacon indicates to the mobile that a hard handoff candidate may be nearby. In response, the mobile will tune to an alternate frequency that is associated with the detected signal.

Upon being triggered to tune to an alternate frequency f2, mobile station 5 tunes to the alternate frequency f2 and performs the activity which is appropriate to the trigger. For example, if the trigger were a Tune_Message, the mobile station 5 would tune to an alternate frequency and perform a search for hard handoff candidates. Once the activity is completed, mobile station 5 retunes to frequency f1 and resumes communication with origination base hard handoff systems, the mobile station 5 transmits a message indicating the results to origination base station 10 of the origination system. The origination system determines whether further action should be taken based upon the results. Other devices or systems may also be involved in determining whether additional action is required. For example, if the mobile station 5 is searching for hard handoff candidates, then the determination is made by the origination system in conjunction with the destination system as to whether to perform a hard handoff, and if so, to which destination base station(s) in the destination system.

While mobile station 5 is tuned to frequency f2, all forward link traffic from origination base station 10 is lost. Additionally, in most conventional systems the same local oscillator is used by the transmitter section and the receiver section of the mobile station. Therefore, any attempt to transmit reverse link data to the origination base station while the receiver is tuned to f2 would be futile. That is, such transmissions would not be received by the origination base station 10 because these transmissions would occur on frequency f2 and origination base station 10 does not monitor frequency f2.

In one example of the method and apparatus disclosed herein, when mobile station 5 is directed to tune to frequency f2 by origination base station 10 the mobile station does not process the information in real time, as was done in the prior art. Rather, mobile station 5 records samples of the signal on frequency f2 and stores those samples in memory. It will be understood that any memory device that is capable of saving the information for processing at a later time can be used, such as a random access memory (RAM). As soon as a desired number of samples have been taken, mobile station 5 retunes to frequency f1 and resumes communication with origination base station 10 over the forward and reverse links 12, 14. In this way, the amount of time that the receiver spends tuned to frequencies other than the frequency over which the mobile is communicating with the origination base station is significantly reduced.

Information transmitted over the forward link is organized in frames that are transmitted over a period of approximately 20 milliseconds. In accordance with well-known conventional techniques for transmitting information over digital wireless communications networks, the information within the frame will be organized as a one or more error correction blocks, depending upon the rate at which the data is being transmitted by the origination base station. Each such block is encoded to generate an error correction sequence. If any of the information within the sequence has been corrupted or lost (i.e., referred to collectively as "received in error"), the remaining information within the sequence may be used to derive that portion of the sequence that was received in error (i.e., "correct" the errors). The amount of information that can be corrected depends upon the particular error correction encoding algorithm that is used. Wireless communications systems commonly rely on convolutional encoding schemes and Viterbi decoders to perform error correction. In addition, information within a block is commonly interleaved to enhance the ability of the error correction scheme to correct errors that are caused by relatively long sequences of information being received in error. Interleaving is a process whereby information within the error correction sequences that is adjacent is dispersed within the error correction sequence (i.e., the sequence is scrambled). For example, if the sequence 13245 is an error correction sequence, then the interleaved error correction sequence might be 41235, such that no two numbers that are adjacent in the original sequence are adjacent in the interleaved sequence. Algorithms for interleaving information are well-known in the art. In some instances, several error correction code blocks may be transmitted together in one 20 millisecond frame. Typically, this occurs in relatively high data rate situations. Nonetheless, each block is encoded independently. Typically, the resulting error correction sequences would be interleaved independently as well.

Figure 2:
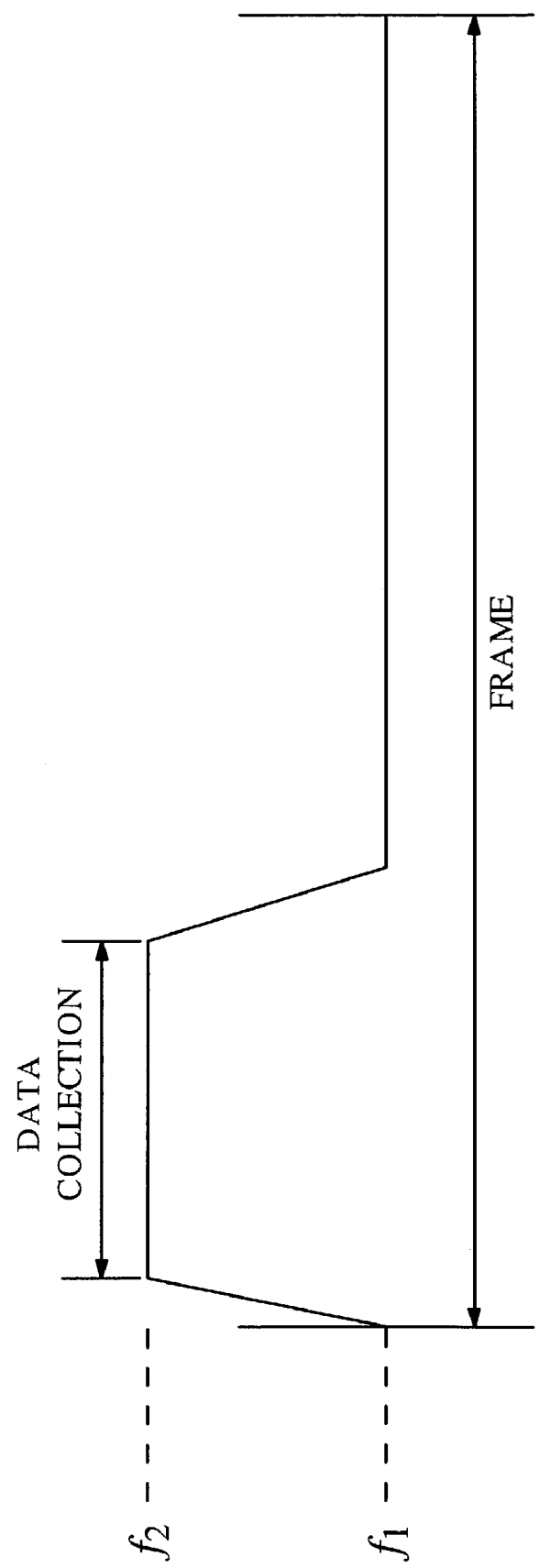
FIG. 2 illustrates the amount of time that the mobile station receiver will be tuned to an alternative frequency.

FIG. 2 illustrates the relative amount of time during which the mobile station 5 is tuned to frequency f2 with respect to the duration of a frame in accordance with one example of the method and apparatus disclosed herein. By tuning the mobile station receiver to the alternate frequency for a period of time that is relatively short, the interleaving and error correction encoding make it possible to derive the content of the information that is not received while the mobile station receiver is tuned to the alternate frequency.

Once data is captured, the search is performed off-line (i.e., while the mobile station 5 is tuned to frequency f1). Accordingly, communications resume between mobile station 5 and origination base station 10 more quickly than is possible if the information that is received is processed while the receiver remains tuned to frequency f2. The duration of time that erasures are introduced by being tuned to frequency f2 is significantly less with the present invention than with the methods of the prior art. In an IS-95 system, the tuning and retuning can be performed in approximately 4 ms. The memory size requirement in such a system allows for 512 chips of data sampled at twice the chip rate, with 4 bits/sample for both the I and Q channels. This results in a storage requirement of 1024 bytes. It will be obvious to one skilled in the art that alternate values can be substituted for those above, each with known tradeoffs in complexity and performance. The capture time in such an embodiment of the present invention is approximately 0.5 ms. An IS-95 data frame is 20 ms in duration. Therefore, for this example the total erasure time of approximately 5 ms does not even corrupt an entire frame.

In accordance with one embodiment, the search for an alternate frequency f2 is aligned with lower rate frames, such as ⅛ rate frames. In this case, the amount of data erased will often be so insignificant as to be correctable by coding and interleaving, such that no errors result.

In an alternative embodiment, to reduce memory requirements, a smaller sample size can be recorded from frequency f2. Those results can be used to compute partial results in an off-line search. Return trips to frequency f2 by mobile station 5 can be performed until the search results are complete. Examples of search implementations are described below.

The method and apparatus results in a further improvement, because the off-line search need not be performed in "real time". The search can be performed as fast as current technology allows the circuits to run, or within power budgets, a tradeoff common in the art. As such, the system can be designed so that both the erasure rate and search time are greatly reduced in comparison with the methods of the prior art.

Because of the possibility of rapid variations in the received signal due to the changing environment in which mobile station 5 operates, it may be desirable to repeat the process of sampling the alternate frequency f2 a number of times if a large number of offsets are to be searched. Repeating the process allows for use of fresh data, while the improvements provided by the present invention reduce the frame error cost associated with repeat ventures to the alternate frequency.

This method of sampling and storing information allows mobile station 5 to begin establishing contact with a target base station while user data is still being transferred by the origination base station over the origination frequency. In addition, mobile station 5 can identify the time offsets at which the multipath signals are being received by the mobile station from the target base station before actually executing the hard handoff. Thus, the amount of time required to acquire the target base station upon execution of the hard handoff is significantly reduced.

Figure 3:
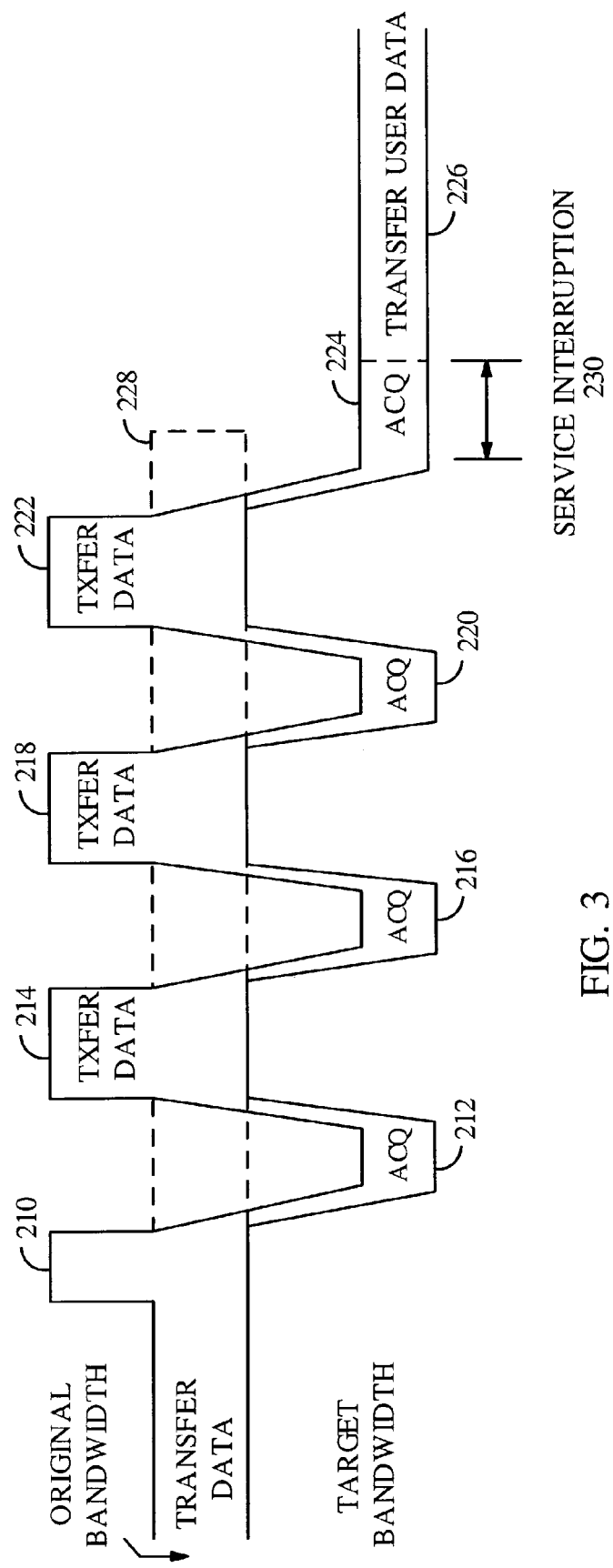
FIG. 3 is a conceptual timing diagram showing an example of the operation in accordance with the present method and apparatus.

FIG. 3 is a conceptual timing diagram showing an example of the operation in accordance with the present method and apparatus. In a time segment 210, energy is transferred over the origination frequency. During a time segment 212, the receiver is retuned from the origination frequency to the target frequency band and the signal received at that frequency is sampled and stored. The receiver is then tuned back to the origination frequency. During the time segment 212, no data is received by mobile station 5 over the origination frequency. The mobile station receiver may be tuned to alternate frequencies and information from these alternate frequencies stored multiple times so that enough information has been stored to allow the mobile station receiver to identify a desired number of hard handoff candidates or determine that no such candidates are present. In FIG. 3, the process is repeated twice more during time segments 214, 216, 218, and 220. During a time segment 222, data is received by the mobile station receiver over the original frequency. During a time segment 224, a handoff from the original frequency to the target frequency is executed. At the beginning of time segment 226, search data is collected over the target frequency. During a portion of the acquisition process in the time segment 224, no user data is transferred resulting in a service interruption period 230.

Because information received over the target frequency was collected and stored within the time segments 212, 216, and 220, the duration of the acquisition process performed after execution of handoff is reduced and may be eliminated in some cases. The abbreviated acquisition process is performed using the preliminary data collected. For example, the mobile station 5 can use the information collected to greatly narrow the search window over which the mobile station 5 looks for assignable multipath signals. In some cases, the mobile station receiver will know the exact offsets for each of the multipath signals that are of interest within the target frequency band.

In accordance with one example of the method and apparatus disclosed herein, immediately before and immediately after tuning the mobile station receiver to an alternate frequency, data is transferred over the original frequency in a manner that effectively increases the instantaneous data rate with respect to the nominally selected data rate. Increasing the data rate with respect to the nominal data rate prevents information from being lost during the break in the reception which occurs when the mobile station 5 is not tuned to the original frequency. That is, by increasing the amount of data that is transmitted before and after the receiver is tuned to the alternate frequency, a window is created during which the receiver in the mobile station 5 can cease receiving information over the original frequency without any reduction in the total amount of data that is transmitted from the origination base station 10 to the mobile station 5. This window is used to collect data on alternate frequencies of interest. The data rate may be increased over the nominally selected rate by a variety of means. The example given below is elegant because it may be implemented within the strictures of the IS-95 system.

One limiting factor in determining the data rate of a system is the desired link performance. The desired link performance is generally determined by the number of errors that can be tolerated in the resulting received signal. The error rate is a function of the ratio of the energy per bit to the noise power density ($e_b/N_o$) at which the signal is received. The energy per bit, $e_b$, is the amount of signal power received integrated over the duration of one bit. For example, the energy per bit is the same if a bit is received at −50 decibels with respect to a milliwatt (dBm) for a duration of one microsecond as if a bit is received at −47 dBm for a duration of 500 nanosecond. The noise power density ($N_o$) is a measure of the background noise to which the bit energy is subjected. Thus, if background noise level remains the same but the power at which the bit is received is doubled, the same data can be transferred in half as much time at the same $e_b/N_o$ and, hence, the same link performance. It is upon this principle that boost mode operates and additional flexibility is added to the channel.

Figure 4:
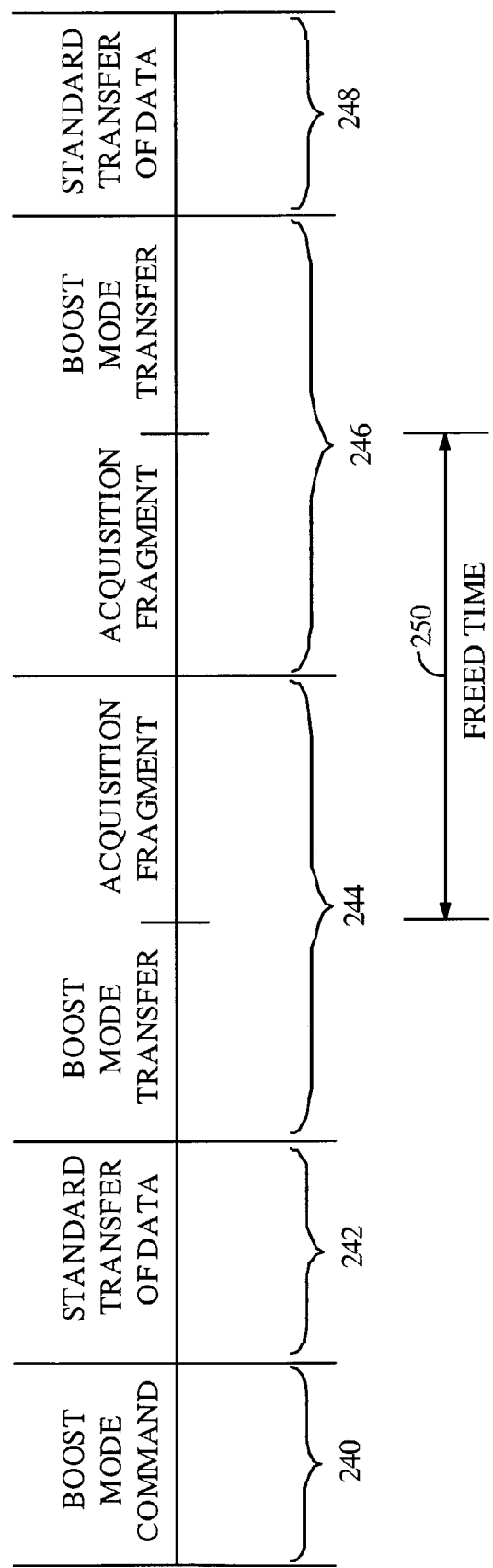
FIG. 4 is a time line showing exemplary operation in boost mode.

Boost mode is a means and method by which the data rate of a system may be temporarily increased. Boost mode operates within the strictures of an IS-95 system but is generally applicable to many systems. FIG. 4 is a time line showing exemplary operation in boost mode. Five frames are shown in FIG. 4 with time running from left to right. When the base station determines a need for boost mode, the base station sends a boost mode command during the frame 240. The boost mode command designates an elected frame pair. In this case, the base station has elected the second and third frame following the frame in which the command is received. During the frame 242, data may be transferred in the standard manner. Also during the frame 242, the mobile station 5 processes the boost mode command. During the frames 244 and 246, the boost mode command is executed. During the first half of the frame 244, the base station transfers data to the mobile station 5 in boost mode. During boost mode the effective data rate is increased. During the second half of the frame 244, the mobile station 5 is free to perform an off-frequency function such as the acquisition fragment process described above. Likewise during the first half of the frame 246, the mobile station 5 is free to continue performing the off-frequency function. During the second half of the frame 246, the base station transfers data to the mobile station 5 in boost mode. During the frame 248, standard data transfer may be resumed.

According to IS-95, each frame is 20 milliseconds in duration. Therefore, the duration of the freed time 250 created by this method is approximately 20 milliseconds. Typically, the mobile station 5 may require about 3 milliseconds to change to the target frequency band and about 3 ms to change back, thus, leaving about 14 milliseconds in order to perform the off-frequency function. If the system is performing acquisition, several boost mode frames may be performed in close succession. Because the field conditions are time variant, acquisition data which is not timely used becomes obsolete.

The specific format of the boost mode command depends upon the off-frequency operations which may be performed. If the boost mode command is specifying that the mobile station 5 performs an acquisition fragment, the boost mode command may have the following format: frequency designation, pilot signal designation, search window size. The frequency designation designates the frequency band or channel at which the mobile station 5 should perform the acquisition fragment. The pilot signal designation designates the sequence that the mobile station 5 should use during the searching process. The search window size designates the set of time offsets over which the mobile station 5 should correlate the sequence to the incoming data. If the relationship between the receipt of the boost mode command and the elected frame pair is not inherent in the message, the boost mode command may also specify the elected frame pair. In FIG. 4, it was assumed that upon receipt of the boost mode command, the mobile station 5 performs the specified task in the second and the third frame following receipt of the boost mode command.

The boost mode data transfer operates elegantly within the strictures of IS-95. Increasing the power at which the base station transmits the forward link signal during boost mode can be used in two distinct ways. First, by transmitting with greater power, the duration of a symbol can be reduced and so more information can be transmitted in the same amount of time. Second, by transmitting with greater power, the integrity of the information that is received will be greater, and therefore, the information will be received with fewer errors. This is especially true in cases in which a fade occurs during a frame. If the frame is transmitted with more power, the fade will be less likely to cease errors. Therefore, even without increasing the rate at which the data is transmitted, the rate at which error free data will be received will be significantly higher. By decreasing the likelihood that errors will occur in the transmission, the error correction capability of the receiver can be used to derive the content of the frame which was lost while the mobile station 5 was tuned to an alternate frequency. Each of these two advantages can be used independently, or they may be used together (i.e., either the power can be raised and the information transmitted at the same rate with fewer errors, or the power can be raised in order to support transmission at a greater rate).

Figure 5:
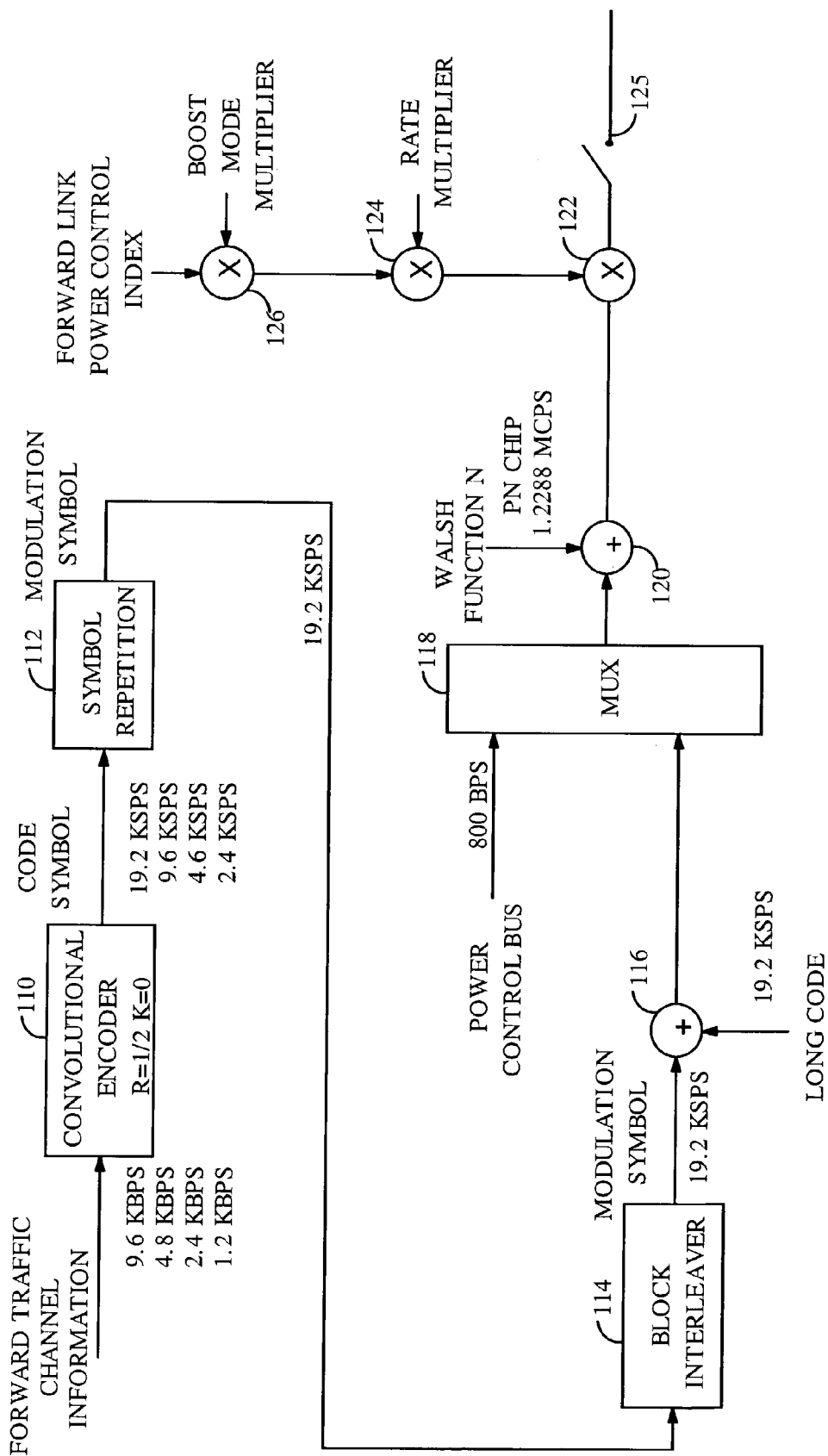
FIG. 5 is a block diagram showing base station operation including the encoding and modulation which is performed on a forward link traffic channel and including boost mode operation.

FIG. 5 is a block diagram showing base station operation including the encoding and modulation which is performed on a forward link traffic channel and including boost mode operation. In contrast with the prior art operation shown in FIG. 4, three inputs determine the amplitude impressed on the signal: the forward link power control index, the data rate multiplier and the boost mode multiplier. The forward link power control index is determined by the forward link power control mechanism. The data rate multiplier is determined by the data rate of the current frame. In addition, a new multiplier 126 impresses the effects of the boost mode multiplier on the control signal that determines the final relative output level. The boost mode multiplier is used to increase the level at which data is transferred during a portion of a boost mode frame to a boost level. A switch 128 is used to interrupt the transmission of signal energy over the forward link channel during the off-frequency portion of the boost mode frame. Alternatively, the gain of the forward link channel may simply be set to zero.

The multiplier 126 and the switch 238 may be implemented in a variety of media including software and hardware. Typical embodiments of the method and apparatus comprise computer software that executes on a standard microprocessor or an application specific integrated circuit (ASIC.) Thus, the method and apparatus disclosed herein is relatively easy to implement.

The mobile station 5 decodes the data within a boost mode frame in the same manner in which it decodes a standard frame. Valid data is produced because of the means by which the data is encoded. If a boost mode frame comprises full rate data, one half of the symbols are not transmitted. For example, during the first elected frame 244 of FIG. 4, the second eight power control groups are not transmitted. Note, however, that due to the pattern used by the block interleaver 114, the first eight transmitted power control groups contain all of the odd numbered symbols and that the second eight power control groups contain all of the even numbered symbols.

As will be appreciated by those skilled in the art, given the symbols corresponding to just one output of the encoder 110, the original bit sequence can be recovered by a standard convolutional decoder such as a Viterbi decoder and the mobile station 5 architecture does not need to be modified in order to operate in boost mode. However, the redundancy, and hence the immunity to data loss (such as due to fading), gained by the encoding process has been lost. If the mobile station 5 does not intervene with the standard data reception process, the energy of the symbols which are not transmitted produce low level noise values which may be input into the decoding process but, by the nature of the decoding process, will not greatly affect the decoded output. Alternatively, the mobile station 5 may intervene and decode the symbols which are not transmitted as erasures at the mobile station 5. Either way, the full rate data bits may be recovered with comparable performance to standard data transfer if the forward link signal level is raised by the boost mode multiplier to overcome the loss of redundancy.

As noted above, according to IS-95, the forward link channel is typically punctured with power control commands. In this way, the forward link channel carries a power control subchannel at the expense of the performance of the forward link channel. Because of the loss of redundancy, the mobile station 5 may not be able to decode the data based on only the even numbered symbols, or only the odd numbered symbols, if the symbols are also subject to power control puncturing. Therefore, when a full rate frame is subject to the boost process, the MUX 118 no longer punctures the power control commands on the forward link channel. In addition, the mobile station 5 interprets each symbol it receives as data rather than replacing the power control bits with erasures before passing them to the decoding process.

Instead of puncturing the power control commands on the forward link channel, the base station simply delays transmission of the power control command. For example, referring again to FIG. 4, the base station punctures the power control commands which would have been transferred in the frame 244 and transmits them in the frame 248 immediately following the second frame 246 of the elected frame pair. Likewise, the power control commands which would have been punctured onto the second frame 246 of the elected frame pair are punctured onto the frame following the frame 248. This operation is advantageous because the reverse link channel will also be interrupted by the off-frequency task and, therefore, the power control commands generated by the base station for the reverse link frames corresponding to the elected frame pair will not produce valid power control information. Therefore, the power control commands which are created based upon the reverse link elected frame pair may be discarded by the base station and the delayed, but valid, power control commands are impressed upon the subsequent frames in place of the invalid commands.

Operation of the lower rates is even more elegant. For ½ rate frames in accordance with IS-95, the first eight power control groups contain all of the symbols from 1 to 192. Note that the second half of the frame is simply a repeat of the first half of the frame. Therefore, even if the energy of one half of the frame is not transmitted, the mobile station 5 still receives all of the symbol data. If the forward link signal level is increased by the boost multiplier to overcome the loss of one half of the signal energy, the mobile station 5 can decode the half rate data with comparable performance as if the entire frame were transmitted.

Likewise, note that for ¼ rate frames accordingly to IS-95, the first four power control groups contain all of the symbols from 1 to 96 and that the symbols in the first four power control groups are simply repeated in the remaining 12 power control groups. Note that for ⅛ rate frames in accordance with IS-95, the first two power control groups contain all of the symbols from 1 to 48 and that the next 14 power control groups repeat the same symbols seven more times. Therefore, if the forward link signal level is increased by the boost multiplier to overcome the loss of one half of the signal energy, the mobile station 5 can decode the quarter rate and eighth rate data with comparable performance as if the entire frame were transmitted. The base station may also disable the power control subchannel for the lower rate data frames.

The increase in power due to the boost mode multiplier increases the interference to the other mobile stations at least during one-half of the frame. During the other half of the frame, no interference is added to the system. Therefore, the average interference added by boost mode is the same as would have been added under normal operating conditions.

In the ideal situation, during a boost mode frame, the output power on the forward link channel is doubled. However, in some cases, such operation may not be necessary or possible. Also, in some cases, it may be sufficient to increase the power by less than double to achieve the desired system performance. In other cases, depending on the current system operating parameters including the mobile station forward link power control index, the base station may choose to deny the current mobile station 5 a full doubling of the forward link channel power in favor of reducing the interference generated to the other mobile stations. For example, typical base station designs limit the range of the forward link power control to approximately 3 dB below and 6 dB above the nominal level. If the boost mode multiplier would dictate a change outside of the allowed range, the affects of the boost mode multiplier may need to be limited.

Figure 6:
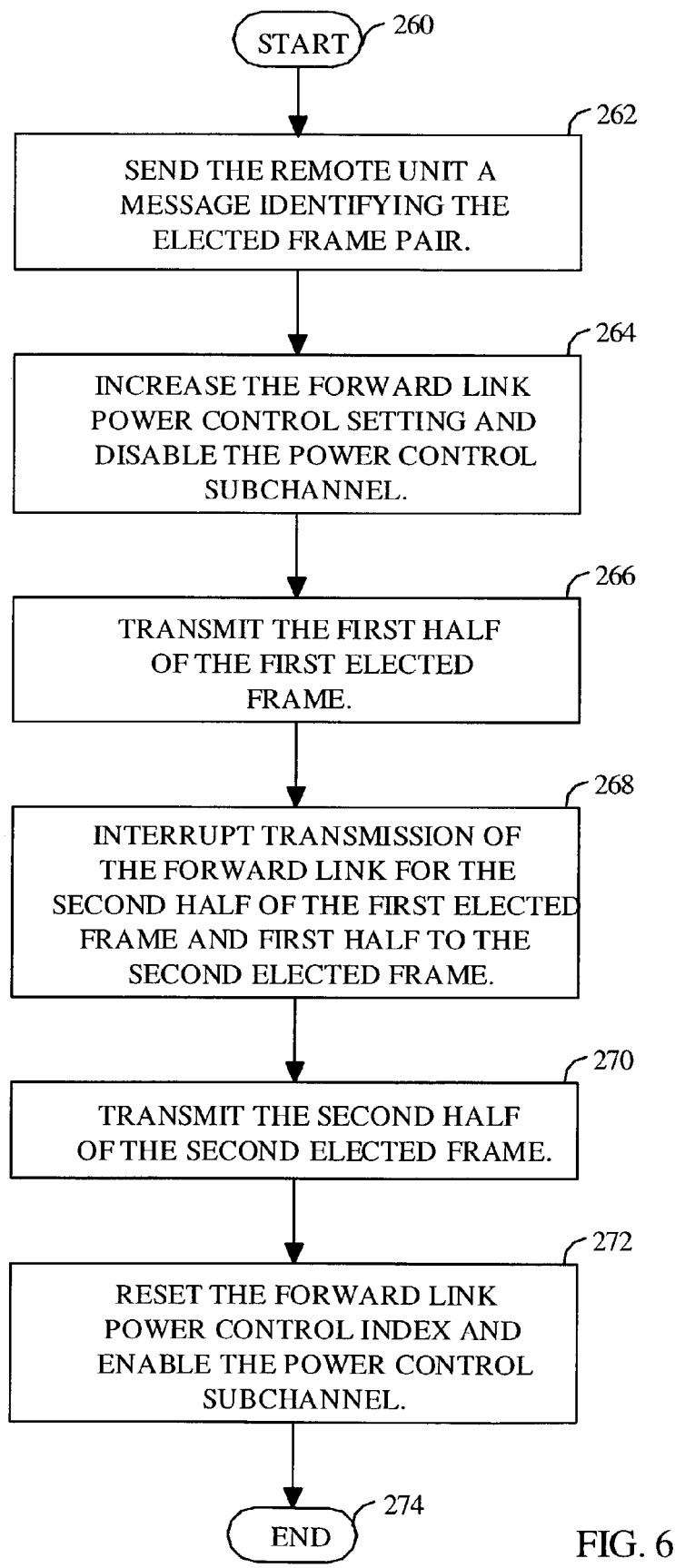
FIG. 6 is a flowchart showing the operation of the base station in accordance with boost mode.

FIG. 6 is a flowchart showing the operation of the base station in accordance with boost mode. Flow begins in a start block 260. In block 262, the base station sends the mobile station 5 a message identifying the elected frame or frames. For example, the elected frames may correspond to the elected frame pair 244 and 246 of FIG. 4. At the time that the base station transmits the first frame of the elected frame pair, the base station increases the forward link power level using the boost mode multiplier as shown in block 264. Also in block 264, the base station disables the power control subchannel by turning off power control puncturing on the forward link channel. In block 266, the base station transmits the first half of the first elected frame. In block 268, the base station interrupts transmission with the forward link for the second half of the first elected frame and for the first half of the second elected frame. For example, referring again to FIG. 5, the base station may open the switch 128. In block 270, the base station transmits the second half of the second elected frame. In block 272, the base station resets the forward link power control to the nominal level by removing the effects of the boost multiplier and enables the power control subchannel. Process flow ends in block 274.

Figure 7:
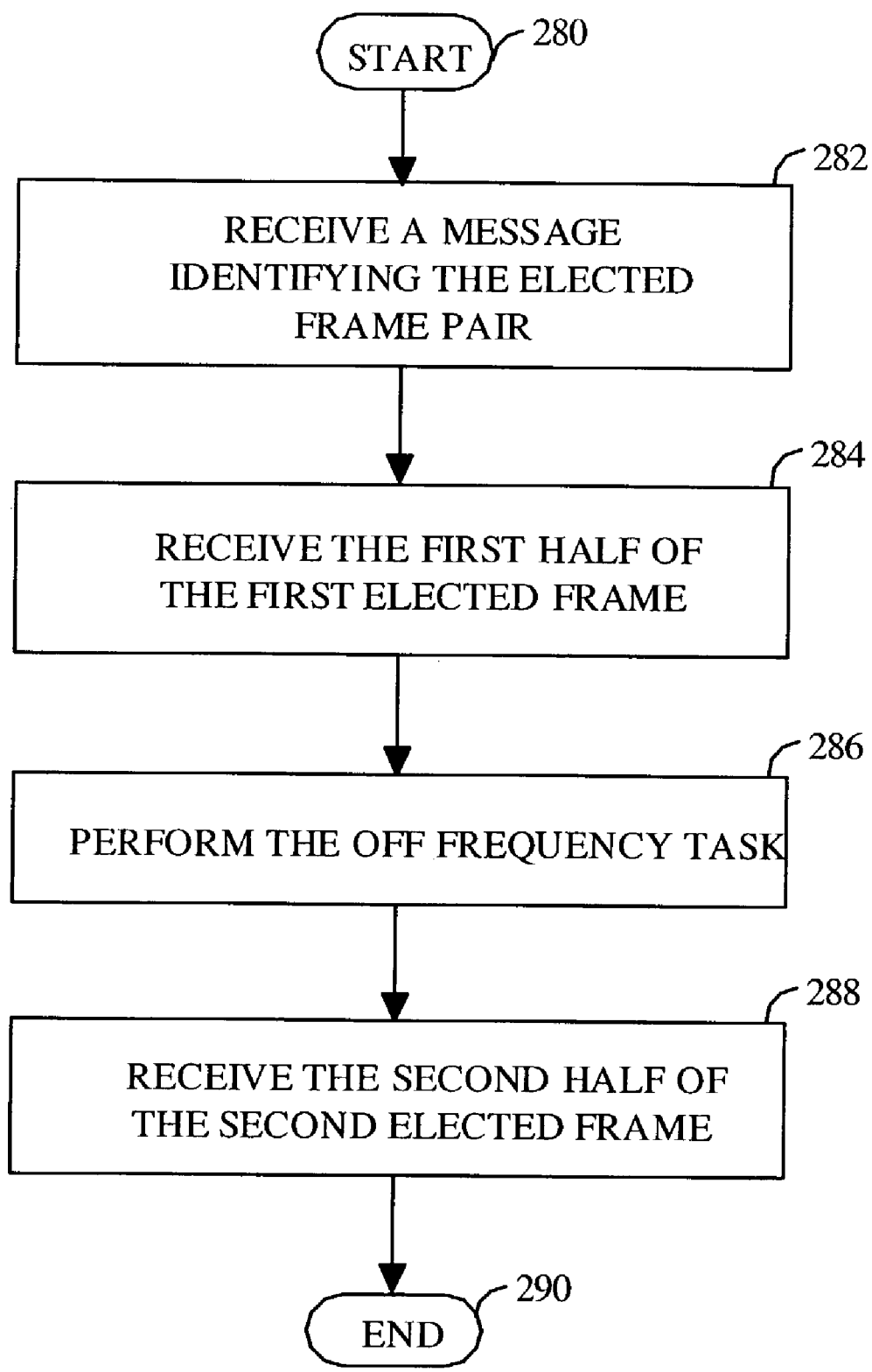
FIG. 7 is a flow chart showing the exemplary operation of the mobile station 5 in boost mode.

FIG. 7 is a flow chart showing the exemplary operation of the mobile station 5 in boost mode. Flow begins in a start block 280. In block 282, the mobile station 5 receives the boost mode command identifying the elected pair. For example, in FIG. 6, the boost mode command transferred in frame 240 designates the frames 244 and 246 as the elected frame pair. In block 284, the mobile station 5 receives the first half of the first elected frame. Processing of that frame happens in parallel with the remaining steps shown in FIG. 7. In block 286, the mobile station 5 performs the off-frequency task. In block 288, the mobile station 5 receives the second half of the second elected frame and decodes the frame as described above. Process flow ends at end block 290.

In general the invention can be implemented in any system in which the symbols are arranged so that a copy of each bit of information is passed during a subportion of a standard data unit. For example, in the description above, the interleaving pattern places a first set of symbols (which comprises an encoded copy of each information bit) from a rate one-half convolutional encoder in the first half of each frame. In terms of a base station/mobile station system described above, either the forward or reverse link or both may be capable of operation in boost mode. For example, in the ideal situation, both the forward and reverse link channels enter boost mode simultaneously so that data is not lost on either link due to the boost mode operation.

Several alternative embodiments of the general principles given above will be readily apparent to those skilled in the art. For example, based on the explanation above, it is clear to see that boost mode operates more elegantly when data is transmitted at less than full rate. Therefore, in one embodiment, the base station imposes a restriction on the data source to force the data to be less than full rate during the elected frame. For example, the base station may impose a restriction on a variable rate vocoder or it may decrease the amount of digital data retrieved from a queue. In yet another embodiment, the base station sends the boost mode command after it examines the elected frame and detects that the elected frame is less than full rate. For example, the boost mode command may designate an elected frame pair which the base station already knows is comprised of less than full rate frames. In yet another embodiment, the base station may attempt to predict the occurrence of low rate frames. For example, digitized voice is statistically patternistic. In digital voice, typically a series of low rate frames are interspersed with bursts of full rate frames. Upon detection of a series of low rate frames, the base station may predict that an elected frame may comprise a low rate frame. During periods of high rate data, the base station may choose to delay issuing the boost mode command. Thus, the base station may predict a frame which is likely to comprise data at less than full rate.

In addition, it is not necessary that the boost mode command consume system resources. For example, in FIG. 4, the boost mode command is seen to consume frame 240 such that no user data is transferred during that frame. However, just as the power control commands are punctured onto the power control subchannel on the forward link channel, the boost mode command may be also punctured within the forward link channel. Alternatively, the boost mode command may be transferred to the mobile station 5 over a separate control channel.

Boost mode may be performed for other reasons besides performing temporary off-frequency tasks at the mobile station 5. For example, the system may use boost mode to create a time during which the mobile station 5 may receive messages on a different channel operating at the same frequency such as a control channel. Alternatively, the freed time may be used to perform an auxiliary function within the base station. If the auxiliary function is performed within the base station, the base station may not need to notify the mobile station 5 with the boost command.

In another example, boost mode may be used to provide extra time to execute a permanent transition to a target frequency band. For example, referring again to FIG. 3, note that during the time segment 222, data is transferred over the origination frequency at the higher boost mode data rate. The data transferred during the time segment 222 would have continued to be transferred over the original channel during the time period indicated by a dashed region 228 under normal operating conditions. Thus, the service interruption period 230 begins at the right hand edge of the dashed region 228 rather than at the right hand edge of time segment 222. During the time indicated by dashed region 228, the mobile station 5 receiver may change the input frequency to the target frequency band and begin the acquisition or abbreviated acquisition process. In this case, the base station sends the mobile station 5 a boost mode transition command which designates an elected frame and a handoff frequency band. The base station sends boost mode data over the first half of the elected frame and terminates transmission during the second half of the elected frame.

In yet another example, boost mode may be used to provide information concerning a valid handoff target frequency. As a mobile station 5 moves about the coverage area of a system, the system is not aware of the exact location of the mobile station 5. In order to determine whether the mobile station 5 is in a location at which it should perform a hard handoff, the mobile station 5 may collect data samples at the target frequency using a similar method to the acquisition fragment process described above. The samples are examined to determine whether mobile station 5 is receiving valid signal levels from target base stations.

In some instances, such as the handoff determination application just described, it may be advantageous to execute boost mode frames in a periodic or patternistic fashion. In such a case, the boost mode command may designate a start time, the pattern or period, and an end time.

In some cases, the mobile station 5 itself may determine the time at which a boost mode frame should be executed. For example, the mobile station 5 may make such a determination based on a reverse link data characteristics or forward link performance characteristics. In such a case, the mobile station 5 sends the base station a boost mode command designating one or more elected frames.

Likewise, it is not necessary that boost mode comprise an elected frame pair. Boost mode may be performed during a single frame or it may be performed over a series of frames. The elected frame pair need not be two continuous frames. If the off-frequency task requires more time than that which is created within an elected frame pair, the base station may execute a first boost mode frame, pause the transmission of forward link channel for a number of frames and, then, execute a second boost mode frame.

Also, the invention may be implemented such that more than half a frame or less than half a frame of freed time is created. For example, if an elected frame carries eighth rate data, in boost mode, the data may be transmitted at approximately eight times the nominal level; thereby creating freed time equal to ⅞ of a frame duration.

In one embodiment of a system which includes the present invention, the time at which the mobile station 5 will cease receiving the forward link signals on the origination frequency from the origination base station 10 and tune to another frequency in order to search for signals being transmitted at such other frequencies is determined by a command from the origination base station 10. The time can be either expressly identified within the command, or a period of time, which is relatively long with respect to the amount of time required to perform a search, can be identified within the command. If a relatively long period of time (e.g., 80 ms) is identified, then the mobile station can select exactly when a search will be performed within this identified period of time. This command is preferably transmitted on the origination frequency. In an alternative system, the mobile system will only tune to other frequencies at predetermined times with respect to the start or end of a frame or another reference point in time which would allow the origination base station 10 and the mobile station 5 to coordinate the time at which the mobile station 5 will cease receiving transmissions from the origination base station 10. The timing of the search can then be coordinated with the time at which short messages are to be sent from the origination base station 10 over the origination frequency.

In addition, once the mobile station 5 performs a search of alternative frequencies, the mobile station 5 reports back to the origination base station 10 the results of the search. Since the origination base station 10 will not be able to receive information from the mobile station until the mobile station 5 is retuned to the origination frequency, the mobile station 5 must also ensure that such report messages are sent only when the mobile station 5 has retuned to origination frequency.

For example, messages (such as control signaling messages) which are less than 5 ms in duration are commonly transmitted to mobile stations on the origination frequency. In accordance with one embodiment of the system, the origination base station 10 ensures that short messages are transmitted only during a first portion (such as the last half) of a 20 ms frame. Therefore, the origination base station 10 commands the mobile station 5 to tune to other frequencies only during portions of the frame other than the first portion (such as the first half) of the 20 ms frame, such that this first portion does not overlap with the those portions of the frame during which either the short messages will be sent from the base station or report message will be sent from the mobile station. This is particularly important in cases in which a frame is divided into multiple subframes.

For example, there is one proposal that is currently being considered by communication industry standards bodies in which a conventional 20 ms frame is divided into four 5 ms frames for transmission on a dedicated control channel. These 5 ms frames may then be grouped into a 20 ms frame. However, each such subframe is encoded with an error correction code, such that errors within a particular subframe can be corrected based on the content of only that subframe. Corrections to the particular subframe can only be made if a sufficient amount of correct data within that particular subframe is received. In this case, tuning the mobile station to another frequency for as little as 3 ms may make it impossible to recover information that is sent during a particular 5 ms subframe, since the information that is contained within such subframes is independently encoded (i.e., the size of a block of data for error correction coding is equal to the amount of data that is transmitted in the 5 ms subframes). Therefore, by ensuring that the origination base station 10 coordinates the time at which short messages are sent with the time at which the mobile station 5 will not be tuned to the origination frequency, both the mobile station 5 and origination base station 10 can be assured that short messages intended for the mobile are successfully received by the mobile station 5. In addition, by coordinating the time at which the mobile station 5 sends report messages to the base station with the time at which the mobile station 5 is tuned to the origination frequency, transmission by the origination base station 10 of the report messages will not be interrupted by the search itself or any subsequent searches.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method comprising:
   determining when a mobile station is tuned from a first frequency to a second frequency;
   collecting and storing data samples received on the second frequency while the mobile station is tuned to the second frequency;
   transmitting messages between an origination base station and the mobile station while the mobile station is tuned to the first frequency; and
   determining time periods during which the mobile station is tuned to the second frequency, based on a reference point in time.

2. The method of claim 1 wherein the reference point in time corresponds to a start of a frame.

3. The method of claim 1 wherein the reference point in time corresponds to an end of a frame.

4. The method of claim 1 wherein transmitting comprises:
   transmitting messages on the first frequency during a predetermined portion of a frame.

5. The method of claim 4 wherein the mobile station is tuned to the second frequency during other portions of the frame.

6. A method comprising:
   determining a time period during which a mobile station is to tune from an origination frequency to an alternate frequency;
   storing data received on the alternate frequency while the mobile station is tuned to the alternate frequency; and
   searching, while the mobile station is retuned to the origination frequency, for pilot signal offsets based on the stored data received on the alternate frequency.

7. The method of claim 6 wherein determining comprises:
   sending a command from an origination base station to the mobile station to instruct the mobile station when to tune to the alternate frequency.

8. The method of claim 7 wherein the command instructs the mobile station to tune to the second frequency at a predetermined time.

9. The method of claim 7 wherein the command instructs the mobile station to tune to the second frequency at any time within a predetermined period of time.

10. The method of claim 6 wherein the time period is determined based on a reference point in time.

11. The method of claim 10 wherein the a reference point in time corresponds to a start of a frame.

12. The method of claim 10 wherein the reference point in time corresponds to an end of a frame.

* * * * *